J. A. HEANY.
METHOD OF MAKING WIRE MESH FABRIC.
APPLICATION FILED MAY 25, 1915.
1,198,349.
Patented Sept. 12, 1916.
2 SHEETS—SHEET 1.
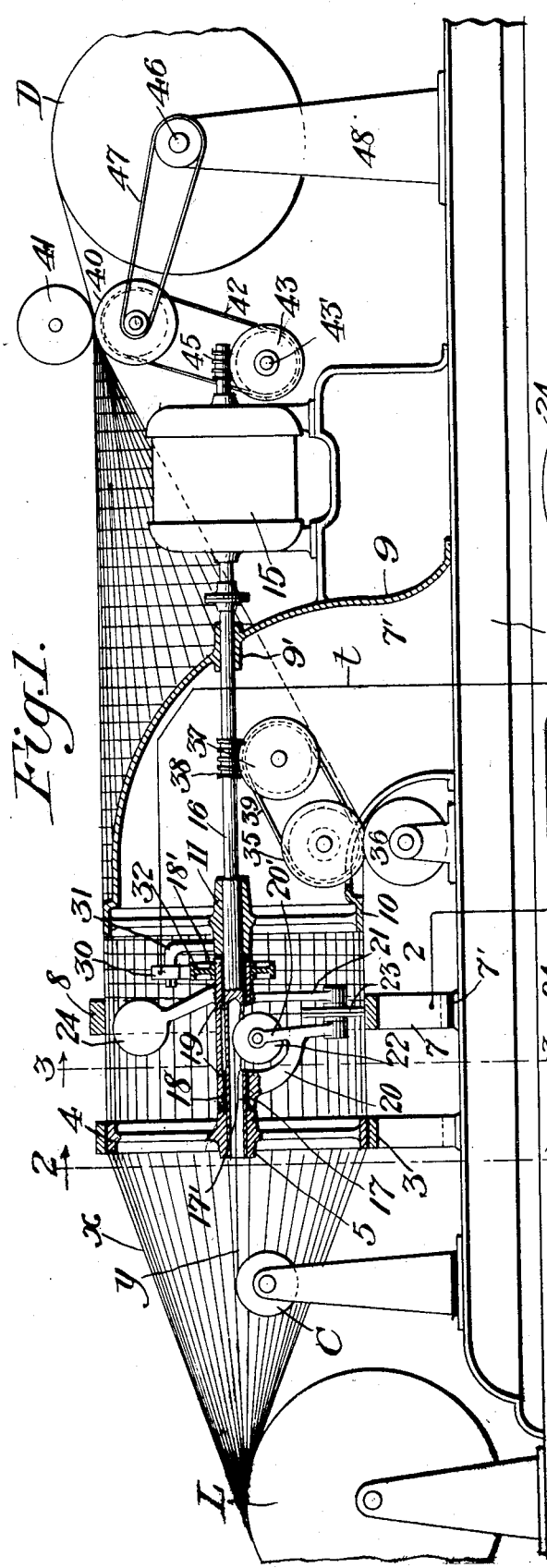
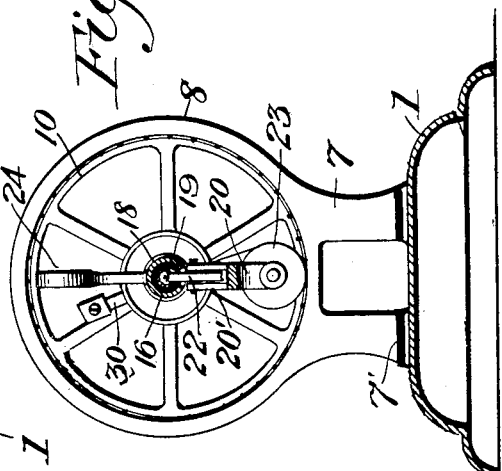
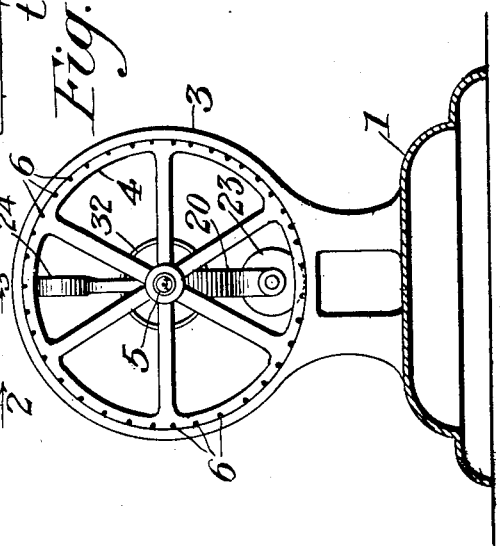
Inventor:
John Allen Heany
by
Pennie Goldsborough & O'Neill
Attys.

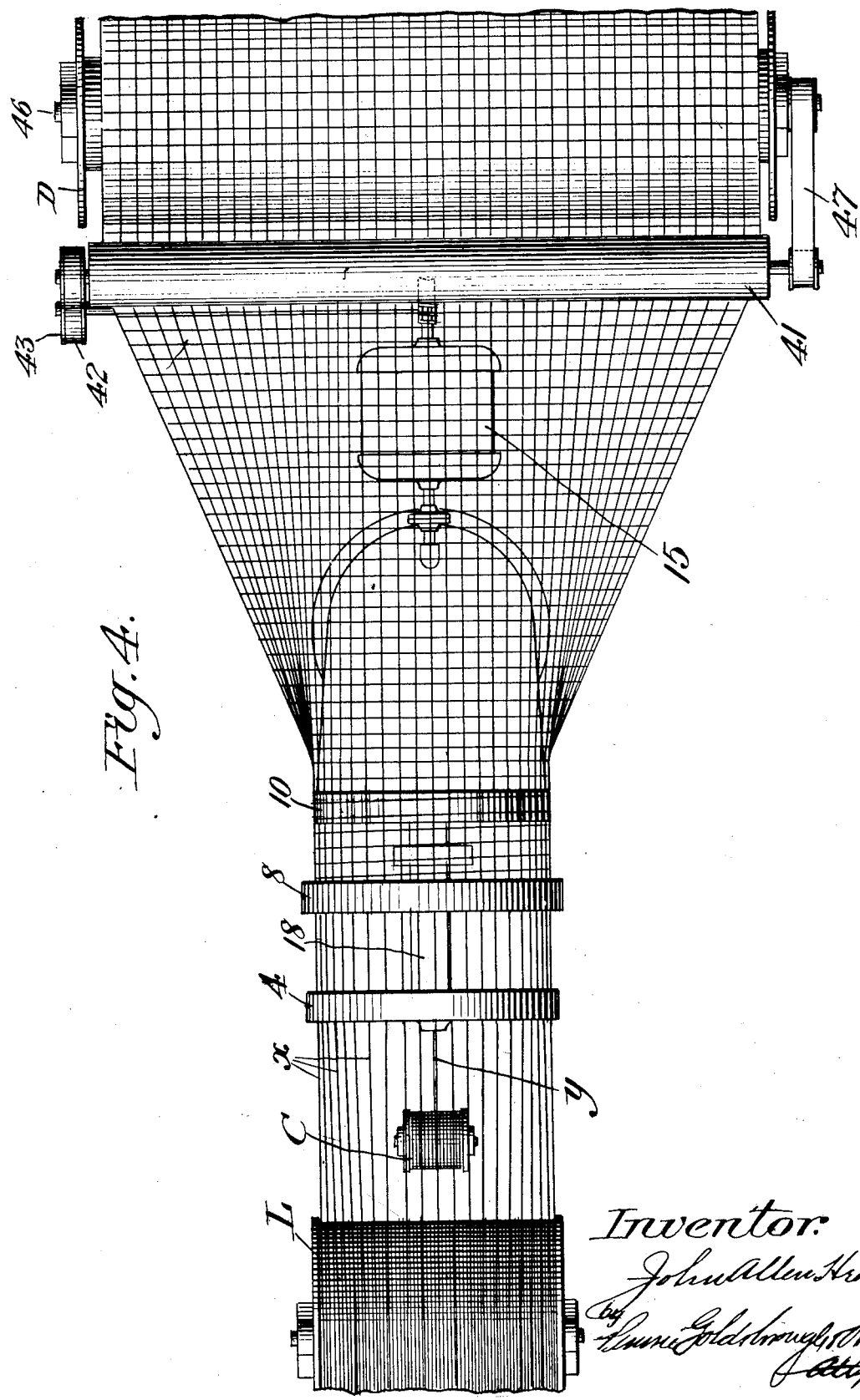

UNITED STATES PATENT OFFICE.

JOHN ALLEN HEANY, OF NEW YORK, N. Y., ASSIGNOR TO PATENTS EXPERIMENT CORPORATION, OF NEW YORK, N. Y., A CORPORATION OF NEW YORK.

METHOD OF MAKING WIRE-MESH FABRIC.

1,198,349.  Specification of Letters Patent.  Patented Sept. 12, 1916.

Application filed May 25, 1915. Serial No. 30,315.

*To all whom it may concern:*

Be it known that I, JOHN ALLEN HEANY, a citizen of the United States, residing in the city, county, and State of New York, have invented certain new and useful Improvements in Methods of Making Wire-Mesh Fabric; and I do hereby declare the following to be a full, clear, and exact description of the invention, such as will enable others skilled in the art to which it appertains to make and use the same.

The invention relates to the manufacture of electrically welded wire cloth or wire-mesh fabric, and has for its object to provide a novel method of producing welded wire fabrics under conditions of maximum efficiency and speed of operation and correspondingly minimum cost of labor and expenditure of electrical energy.

To these ends, the invention involves the feeding of a series of longitudinal wires in substantially tubular relation to constitute the longitudinal strands of the fabric, applying a wire in successive convolutions to engage the longitudinal wires to form the cross strands, and welding the longitudinal and cross strands at the points of contact thereof, and finally, if desired, severing the tubular fabric thus formed longitudinally and spreading the same out in a flat sheet-like formation, preparatory to winding the same upon a suitable storage reel.

In a divisional application filed September 7, 1915, Serial No. 49,334, I have shown, described and claimed, typical mechanism for carrying out the method constituting the subject-matter of the present application.

Electrically welded wire fabric has heretofore been made by stretching the longitudinal and cross wires between two sets of multiple electrodes to bring the electrodes in contact with the wires where they cross each other, and passing current in large volume through the points of contact to heat the contacting surfaces of the wires to welding point, and subsequently applying pressure to the electrodes so as to force the cross wires to adhere to the longitudinal wires and form an effective joint between the same by the application of heat and pressure. This old mode of procedure was necessarily slow and expensive, first, because the welding operation could be carried out only intermittently and had to be suspended while the fabric was fed forward, secondly, because it necessarily involved a relatively large number of sets of electrodes arranged in parallel relation, which required a heavy expenditure of current, and thirdly, because the mechanism for carrying out the former processes was necessarily heavy, complicated and expensive, not only to build, but to operate and maintain in effective condition. According to the present invention, however, the welding operation is carried on practically continuously between two electrodes only, and the feed of the longitudinal and cross wire is also continuous so that the speed at which the machine operates is limited only by mechanical considerations of safety.

A typical machine for carrying out the invention is illustrated in the accompanying drawings, in which, Figure 1 is a more or less diagrammatic side elevation of the machine, certain parts being shown in section; Fig. 2 is a vertical section on line 2—3 of Fig. 1; Fig. 3 is a corresponding section on line 3—3 of Fig. 1, and Fig. 4 is a plan view.

Referring to the drawings, 1 indicates the base or bed plate of the machine upon which there is mounted an annular guide frame 2 for the longitudinal wires of the fabric, which guide frame comprises three separate parts, the first consisting of an annular rim-like member 3, within which is supported a spider 4 having a rim provided with a series of spaced notches 6 corresponding in number with the longitudinal wires of the fabric, the central hub-like portion 5 of the spider constituting a journal-bearing for the longitudinal shaft of the machine, to be hereinafter described; the second member of the guide frame comprising an annular rim 8 having its interior finished with a smooth surface, said rim being supported by a standard 7, insulated as at 7', from the bed plate 1; the third member comprising a hollow elbow-shaped casting 9, at the forward open end of which is a spider-like member 10 having a smooth outer annular guide surface and a centrally located hub 11 which constitutes a shaft bearing. The three members of the guide frame are disposed in the relation shown in the drawings, namely with the central guide rim 8 located between the lateral guide rims 4 and 10 respectively.

Located on a rearward extension of the frame member 9 is an electric motor 15, having a forwardly extending horizontal shaft 16, rotating in a journal bearing 9', and the journal bearings formed in the hubs 5 and 11 of the frames 4 and 10. The forward end of the shaft 16 is cored out as at 17 and provided with a lateral opening 17'. Secured to the shaft 16 between the hubs 5 and 11 is a casting comprising a sleeve 18 having lateral arms 20 and 21, opposite which is a counterweight carrying arm 24. The sleeve 18 is separated from the shaft 16 by suitable insulating bushings 19. Mounted on a forked extension 20' of the arm 20 is a guide wheel 22, which projects through the opening 17' into the hollow portion 17 of the shaft 16. Journaled on a cross pin in the ends of the arms 20 and 21 respectively is a guide wheel 23 lying adjacent the inner surface of the guide rim 8. This part of the apparatus constitutes a rotatable flier which is fixed to shaft 16 so that the guide wheel 23 travels in a circular path within the guide rim 8.

Mounted on the sleeve 18 adjacent the hub 11 is a contact disk 18', the periphery of which is engaged by a stationary brush 30 adjustably mounted on a supporting arm 31, connected with the hub 11.

At the forward part of the machine there is located a reel or drum L, upon which the longitudinal wires $x$ are wound and from which the said wires are led, in the manner indicated in the drawings. A second wire supply drum C is mounted on a suitable standard secured to the bed plate 1, the said second supply drum delivering a single strand of wire $y$ axially through the hollow end of shaft 16, over the guide wheel 22, thence radially and outwardly over the guide wheel 23, which latter also constitutes one of the electrodes.

To the rear of the guide rim 10 is journaled a pair of rotary slitting knives 35 and 36, the upper knife 35 being driven by a chain 39 from a sprocket wheel 37, which is geared to a worm 38 on motor shaft 16. Mounted in suitable standards, not shown, on the rear part of the bed plate 1, are two guide and fabric flattening rollers 40 and 41, the former of which is driven by a belt 42 engaging a pulley 43, upon a cross shaft 43', which in turn is rotated by a worm 45 on the rear end of the motor shaft.

Mounted in standards 48 at the rear of the machine is a storage drum or reel D, upon which the finished fabric is wound, said drum being rotated in a proper direction by means of a pulley 46 on a shaft connected by a belt 47 with a relatively small pulley on the shaft of roll 40. The tension of the belt 47 is so adjusted as to admit of a reasonable amount of slip, thereby permitting the drum D to be run at varying speeds, depending upon the amount of wire fabric wound thereon, and therefore to allow for a uniform feed of the longitudinal wires through the machine.

It will be noted that the central member formed by the guide rim 8 constitutes one of the electrodes and the guide wheel 23 the other electrode, and these two members constitute the terminals of an electric circuit indicated by a lead $t$ connected to brush 30 engaging contact wheel 18', which is in electric contact with the sleeve 18 and therefore with the guide wheel 23 through the supporting arms 20 and 21 thereof. The other side of the electric circuit is connected to the guide rim 8, preferably through the standard 7 thereof, as indicated.

In operating the machine as described, and to carry out the novel method of the present invention, the longitudinal wires $x$ are withdrawn from the reel L and fed through the guide slots 6 of the spider 4, forming part of guide frame member 3, thence through the guide rim 8 and in contact with the interior annular surface thereof, after which they are passed over the outer surface of the guide rim 10, through the rollers 40 and 41 to the central core or spindle of the reel or drum D, to which the ends of the longitudinal wires are secured in properly spaced relation. The cross wire is then led from the reel C axially through the hollow end 17 of shaft 16, over guide wheels 22 and 23 and the end of the cross wire is welded fast to one of the longitudinal wires, by passing current from lead $t$ by way of brush 30, contact wheel 18', sleeve 18, flier arms 20 and 21, contact wheel 23, through the point of contact between a longitudinal wire and the end of the cross wire, guide rim 8 thence by wire $t'$ back to the source. This operation may be readily effected by rotating the shaft 16 manually or otherwise until the guide wheel 23 brings the end of the cross wire $y$ in contact with any one of the longitudinal wires. The electric motor is then started, thereby rotating the flier mechanism which supplies the cross wire $y$, driving the slitting knives 35 and 36, the flattening rolls 40 and 41 and the take-up drum or reel D. The rotation of the reel or drum D draws the longitudinal wires $x$ uniformly through the machine, the disposition of the longitudinal wires in passing through the guide frame 2 being in the form of a tube or hollow cylinder, as indicated. The rotation of the flier mechanism likewise draws the wire $y$ from the reel C and lays the same in successive spiral convolutions, uniformly spaced, inside of and in contact with the annular series of longitudinal wires $x$, the guide wheel 23 directing the wire $y$, with considerable pressure, into contact with each of the longitudinal wires as said wheel 23 is revolved with the flier mechanism. As the guide wheel 23 presses successive portions of the wire $y$ into engagement with the successive longitudinal wires $x$, the electric current flowing by way of lead $t$, brush 30, contact wheel 18′, sleeve 18, and arms 20, 21 through contact wheel 23, passes through the crossed wires lying between the periphery of said wheel 23 and the inner face of the guide rim 8, and thence by way of lead $t'$ back to the source. The passage of the electric current through the crossed wires, with the necessary element of mechanical pressure imposed upon the joint of the wires between wheel 23 and the rim 8, effects an even and uniform welding of the crossed wires. It will be understood, of course, that the electric current is regulated to generate sufficient heat to cause the crossed wires to unite under the pressure imposed. As the flier mechanism continues to rotate, the wire $y$ will be laid up and welded in successive uniformly spaced convolutions to the longitudinal wires $x$. Preferably a direct current is employed to effect the welding operation, because the constant value of such current admits of the machine being operated at a very high rate of speed, which is limited only by the rate at which the wires can be fed with safety.

The constant feeding movement of the drum D draws the fabric through the machine over the guide rim 10, subsequent to which, and before the finished fabric is taken up by the drum, the lower portion of the tubular fabric, as formed, passes between the slitting knives 35 and 36, which cut the successive cross wires, thereby permitting the fabric to be gradually opened out and flattened by the rolls 40 and 41, the finished flattened fabric being finally taken up by the drum or reel D from which the completed rolls of fabric may be removed from time to time. It will be understood that the fabric may be made in continuous lengths, after the machine has once been started, by merely supplying new spools or reels of longitudinal and cross wires, and welding or otherwise joining the same to the ends of the corresponding wires from the exhausted spools, before said wires are passed into the machine. Similarly, when the roll or drum D has stored up a sufficient quantity of wire to constitute a commercial roll, the fabric may be severed transversely and the rolled fabric removed from the reel, after which the free end of the fabric still in the machine may be again attached to the core of roller D and the operation proceeded with as before.

It will be noted that the operation of the machine is practically automatic, after it has once been started, and the speed at which the fabric can be manufactured is limited only by the speed at which it is safe to run the rotating parts of the mechanism, such as the flier, and that the welding operation can be effected just as well at high speed as at low speed, depending only on the character of current employed, which at high speed of operation of the machine must be somewhat heavier than at lower speeds. Generally speaking, however, for wire fabric made up of relatively light strands, the welding of successive joints between the longitudinal and cross wires is practically instantaneous. For manufacturing heavier fabrics, the machine may either be operated at a somewhat slower speed, or the volume of the current supplied to effect the welding appropriately increased.

It will be understood, of course, that the illustration of the preferred form of machine is more or less diagrammatic and exemplary, and that the particular illustration of the relative size and disposition of the longitudinal and cross wires is merely illustrative, as both the method and the apparatus are capable of producing fabrics of any desired size of wire and size of rectangular openings defined by the longitudinal and cross wires.

What I claim is:—

1. The method of making wire mesh fabric, which consists in electrically welding the longitudinal and cross wires in the form of a tube, and splitting the tube longitudinally.

2. The method of making wire mesh fabric, which consists in arranging and feeding a series of wires in substantially tubular relation to form the longitudinal strands, applying a wire in successive convolutions to engage the longitudinal wires and form the cross strands, and welding the longitudinal and cross strands at the points of contact thereof.

3. The method of making wire mesh fabric, which consists in arranging and feeding a series of wires in substantially tubular relation to form the longitudinal strands, applying a wire in successive convolutions to engage the longitudinal wires and form the cross strands, and electrically welding the longitudinal and cross strands at the points of contact thereof.

4. The method of making wire mesh fabric, which consists in arranging and feeding a series of wires in substantially tubular relation to form the longitudinal strands, applying a wire in successive convolutions interiorly of the tubular formation to engage the longitudinal wires and form the cross strands, and electrically welding the longitudinal and cross strands at the points of contact thereof.

5. The method of making wire mesh fabric, which consists in arranging and feeding a series of wires in substantially tubular relation to form the longitudinal strands, applying a wire in successive convolutions to engage the longitudinal wires and form the cross strands, welding the longitudinal and cross strands at the points of contact thereof, and splitting the resulting tubular fabric longitudinally.

6. The method of making wire mesh fabric, which consists in electrically welding together superposed longitudinal and transverse wires arranged in generally tubular formation, and severing the transverse wires along the longitudinal line of the fabric to admit of the latter being flattened out.

In testimony whereof I affix my signature.

JOHN ALLEN HEANY.